(12) United States Patent
Burry et al.

(10) Patent No.: US 7,640,672 B2
(45) Date of Patent: *Jan. 5, 2010

(54) LASER REFERENCE DEVICE

(75) Inventors: James Michael Burry, Troutman, NC (US); Derek J. Nash, Huntersville, NC (US); John C. Smith, Denver, NC (US); Douglas G. Johnson, Cramerton, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/124,370

(22) Filed: May 21, 2008

(65) Prior Publication Data

US 2008/0282561 A1 Nov. 20, 2008

Related U.S. Application Data

(63) Continuation of application No. 11/162,476, filed on Sep. 12, 2005, now Pat. No. 7,377,045.

(51) Int. Cl.
*G01B 11/26* (2006.01)
*G01C 15/00* (2006.01)

(52) U.S. Cl. .................................................. 33/286

(58) Field of Classification Search .................... 33/286
See application file for complete search history.

(56) References Cited

U.S. PATENT DOCUMENTS

| | | | |
|---|---|---|---|
| 3,628,874 A | 12/1971 | Tagnon et al. |
| 3,635,565 A | 1/1972 | Colson |
| 3,897,637 A | 8/1975 | Genho |
| 3,964,824 A | 6/1976 | Dixon |
| 4,031,629 A | 6/1977 | Paluck |
| 4,111,564 A | 9/1978 | Trice, Jr. |
| 4,221,483 A | 9/1980 | Rando |
| 4,751,782 A | 6/1988 | Ammann |
| 4,852,265 A | 8/1989 | Rando et al. |
| 4,854,704 A | 8/1989 | Funazaki et al. |
| 4,912,851 A | 4/1990 | Rando et al. |
| 4,993,161 A | 2/1991 | Borkovitz |
| 5,075,977 A | 12/1991 | Rando |
| 5,144,487 A | 9/1992 | Hersey |
| 5,208,438 A | 5/1993 | Underberg |
| 5,367,779 A | 11/1994 | Lee |
| 5,500,524 A | 3/1996 | Rando |
| 5,539,990 A | 7/1996 | Le |

(Continued)

OTHER PUBLICATIONS

First Office Action from Chinese Examiner for Chinese Application No. 02810031.X corresponding to U.S. Appl. No. 11/162,476, dated Jul. 29, 2005.

*Primary Examiner*—Christopher W Fulton
(74) *Attorney, Agent, or Firm*—Dennis J. Williamson; Matthew W. Witsil; Moore & Van Allen PLLC

(57) ABSTRACT

The laser reference tool of the invention consists of a base that can be releasably mounted to a surface. A housing is mounted on the base such that it can be repositioned relative to the base in a direction parallel to the surface. A turret carrying the laser module is rotatable about first and second orthogonal axes. The laser module is also rotatable relative to the turret about a third axis orthogonal to the first and second axes.

21 Claims, 10 Drawing Sheets

U.S. PATENT DOCUMENTS

| | | | |
|---|---|---|---|
| 5,617,202 A | 4/1997 | Rando |
| 5,819,424 A | 10/1998 | Ohtomo et al. |
| 5,864,956 A | 2/1999 | Dong |
| 5,907,907 A | 6/1999 | Ohtomo et al. |
| 5,983,510 A | 11/1999 | Wu et al. |
| 6,035,540 A | 3/2000 | Wu et al. |
| 6,073,353 A | 6/2000 | Ohtomo et al. |
| 6,178,649 B1 | 1/2001 | Wu |
| 6,202,312 B1 | 3/2001 | Rando |
| 6,351,890 B1 | 3/2002 | Williams |
| 6,427,347 B1 | 8/2002 | Butler, Sr. |
| 6,493,955 B1 | 12/2002 | Moretti |
| 6,502,319 B1 | 1/2003 | Goodrich et al. |
| 6,568,094 B2 | 5/2003 | Wu |
| 6,710,929 B2 | 3/2004 | Phuly et al. |
| 6,735,879 B2 | 5/2004 | Malard et al. |
| 6,739,062 B2 | 5/2004 | Jan et al. |
| 6,792,685 B1 | 9/2004 | Ng et al. |
| 6,871,408 B2 | 3/2005 | Malard et al. |
| 6,914,930 B2 | 7/2005 | Raskin et al. |
| 6,935,034 B2 | 8/2005 | Malard et al. |
| 7,269,907 B2 | 9/2007 | Levine et al. |
| 7,377,045 B2 * | 5/2008 | Burry et al. ............ 33/286 |
| 2002/0083603 A1 | 7/2002 | Jang |
| 2005/0278966 A1 | 12/2005 | Liu |

* cited by examiner

LASER REFERENCE DEVICE

RELATED APPLICATION

This application is a continuation application of U.S. patent application Ser. No. 11/162,476, filed Sep. 12, 2005, now U.S. Pat. No. 7,377,045, issued May 27, 2008, the entire contents of which are incorporated herein by reference.

BACKGROUND

The invention relates generally to a laser reference device and more particularly to a laser reference tool that may be wall mounted and that can be accurately aligned to user selectable orientations.

Traditional reference tools, such as levels, consist of one or more level vials mounted in a level body. The level body has one or more leveling faces that are calibrated with reference to the level vials such that one of the leveling faces can be placed against a surface and level readings made from the level vials. Laser level devices consist of a body supporting a laser generating device and a lens for focusing the laser. The lens can focus the laser into a beam of light that is projected as a dot on a surface or a plane of light that is projected as a line on a surface. The light pattern projected on the surface may be used as a reference point for locating and orienting articles.

Devices exist to project a plane of light onto a vertical surface such as a wall. One type of device sits on a horizontal surface and is oriented relative to vertical. Other laser reference devices may be mounted directly to the vertical surface to project light on that surface and/or on other surfaces. In order to orient the device on the vertical surface at least one level vial is mounted on the device to provide the user with a visual indication of the orientation of the device relative to true plumb or true level to control the projection of the light onto the surface. Because the device is manually oriented and the device relies on the ability of the user to orient the device by visually inspecting the level vial while simultaneously mounting the entire device on the surface, these devices can be difficult to orient to true plumb and/or level. Errors may be introduced as a result. Moreover, because the surface on which the device is supported may not be perfectly level or plumb, leveling the laser module in only one plane may not properly orient the device with respect to true level or true plumb.

Other devices that attach directly to a vertical surface use a pendulum device to orient the device to true level. Typically, the use of the pendulum type arrangement only allows the device to be properly oriented to one position. A pendulum based device is also known that is intended to allow the device to be oriented to multiple positions. The positions are predefined and limited, however, thus limiting the flexibility of the device. Moreover, the use of a pendulum to orient the device in multiple positions has not proved to be sufficiently accurate.

Thus, an improved laser reference device that can be fixed to a vertical surface and accurately oriented to a wide variety of positions is desired.

SUMMARY

The laser reference tool of the invention consists of a base that can be releasably mounted to a surface. A housing is mounted on the base such that it can be repositioned relative to the base in a direction parallel to the surface. A turret carrying the laser module is rotatable about first and second orthogonal axes. The laser module is also rotatable relative to the turret about a third axis orthogonal to the first and second axes.

DETAILED DESCRIPTION OF PREFERRED EMBODIMENTS OF THE INVENTION

Figure 1:
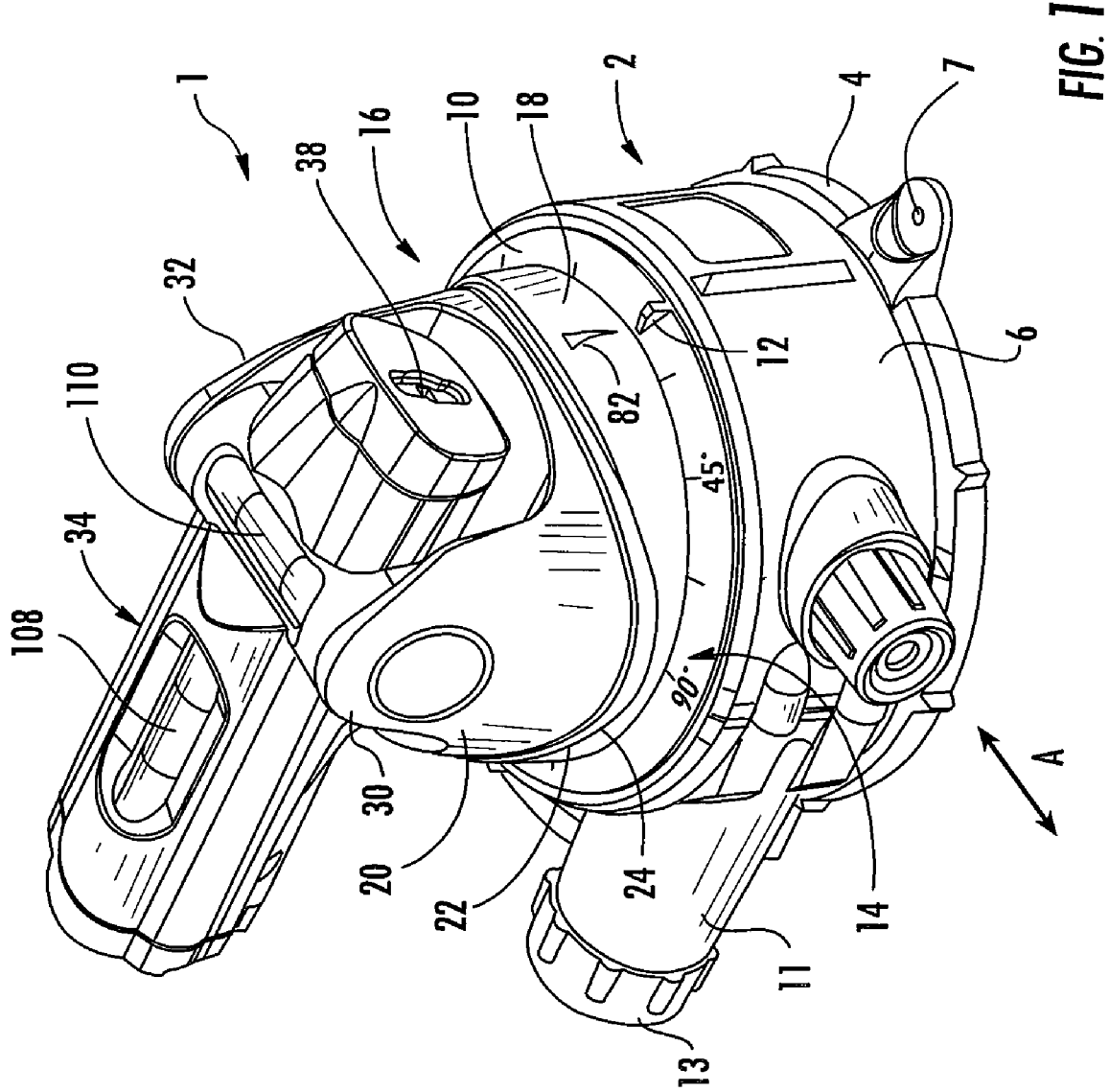
FIG. 1 is a perspective view showing an embodiment of the laser reference tool of the invention.
Figure 2:
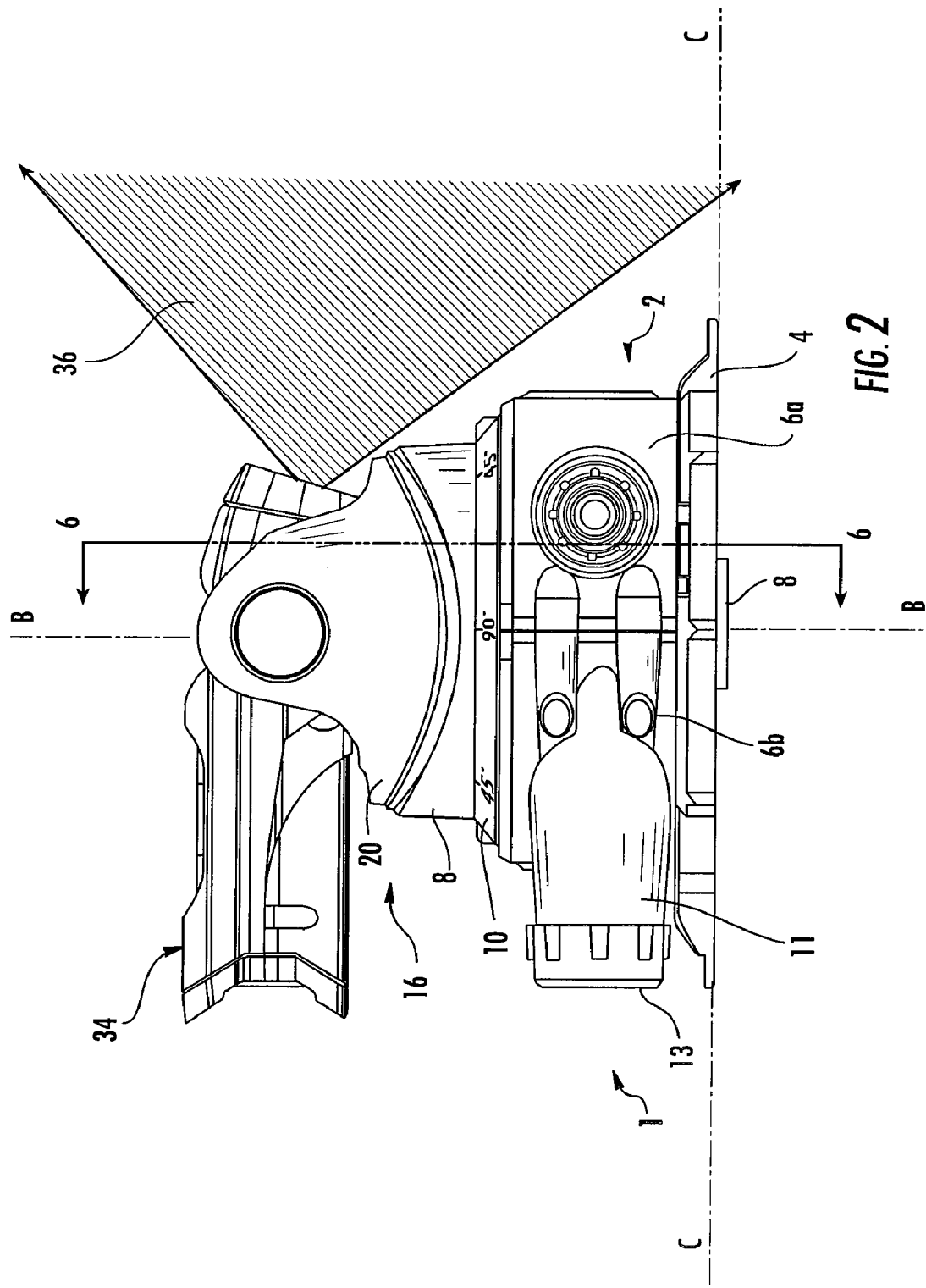
FIG. 2 is a side view of the laser reference tool of FIG. 1.
Figure 3:
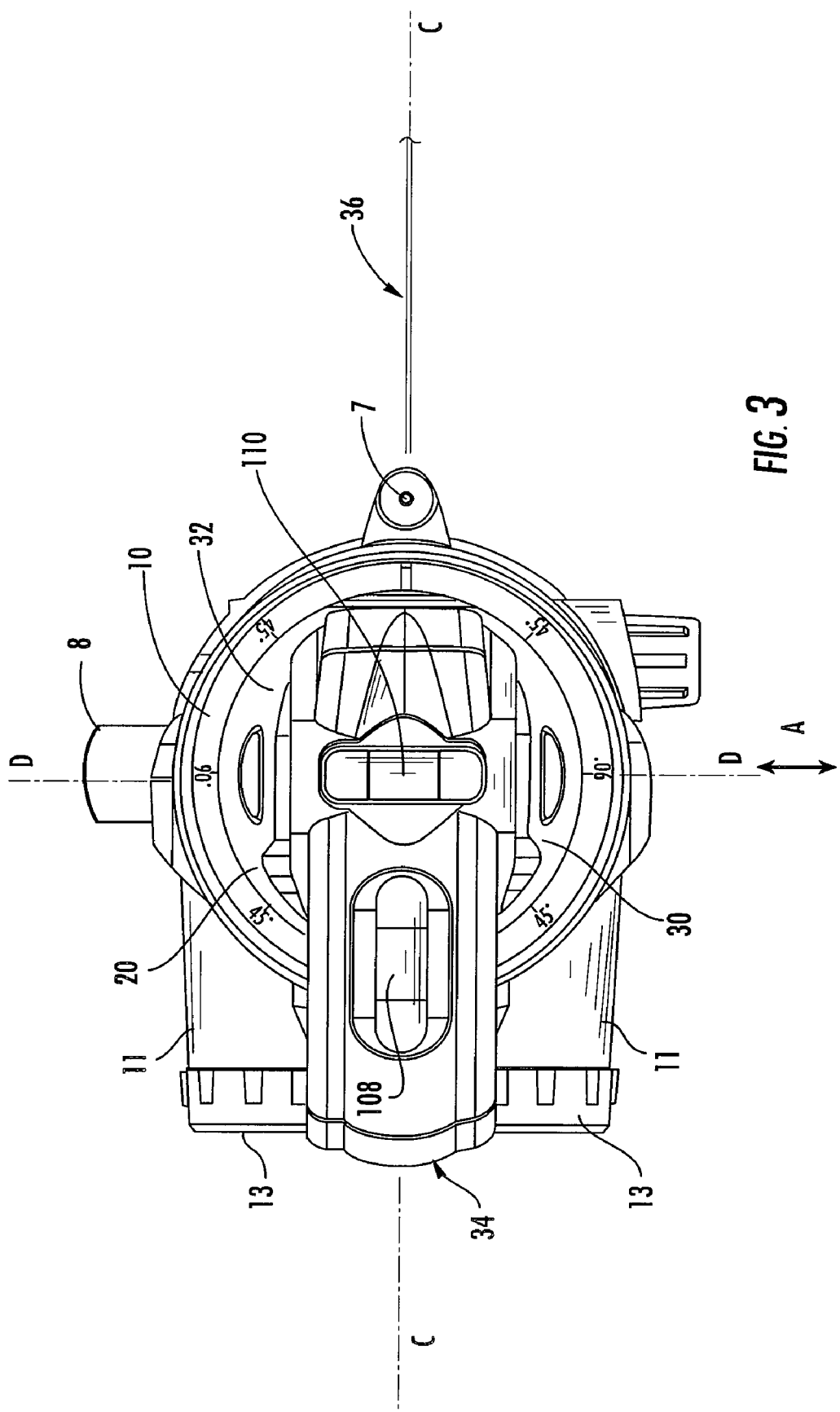
FIG. 3 is a plan view of the laser reference tool of FIG. 1.

The invention is shown generally at 1 and consists of a housing 2 mounted on a base 4 such that the housing 2 can reciprocate relative to base 4 in a linear direction as represented by arrow A. The base 4 may be placed on or attached to a substantially horizontal surface such as a floor or attached to a substantially vertical surface such as a wall by any type of releasable attachment mechanism. In one embodiment the attachment mechanism comprises releasable adhesive tape 8 where the tape can be secured to the base 4 and the vertical surface to hold the tool 1 on the vertical surface. The tool 1 can be detached from the surface by stretching the tape to destroy its adhesive properties as is known in the adhesive tape art. The tool 1 may also be attached to the vertical surface by pins, nails, screws or the like that extend through apertures 7 and 9 and penetrate the surface. The base 4 may also be attached to the vertical surface by suction, adhesive or the like.

It is to be understood that the terms "vertical surface" and "horizontal surface" are used broadly to refer to surfaces that are generally vertical and horizontal, respectively, and are not limited to surfaces that are true vertical and horizontal planes. The term "horizontal surface" is used to indicate a surface on which the device will remain in position without the need for an attachment mechanism and can include inclined surfaces. The term "vertical surface" is used to indicate a surface that requires that the device to be held in position either by an attachment mechanism or manually. While no attachment mechanism is required on a horizontal surface, an attachment mechanism may be used to hold the device securely in position.

Mounted to housing 2 is guide 10. Guide 10 consists of a ring rotatably mounted relative to housing 2 such that the guide can be rotated relative to housing 2 about axis B-B that extends perpendicularly to the base 4. Guide 10 includes markings 14 that may be used to reference the angular position of guide 10 relative to housing 2. In one embodiment markings 14 are made at 15 degree intervals. A zero marking may be indicated by raised protrusion 12.

A turret 16 is mounted to housing 2 and consists of a base 18 and a support portion 20. Base 18 is rotatably mounted relative to guide 10 and housing 2 such that base 18 can be rotated relative to guide 10 and housing 2 about axis B-B.

Support portion 20 includes a pair of upstanding supports 30 and 32 that support laser module housing 34 therebetween. The supports 30 and 32 support laser module housing 34 for pivoting motion about axis E-E. A laser module 112 that includes a laser diode 112a and a collimating lens 112b is located within laser module housing 34 to generate a beam of light 113. The beam of light 113 is focused into a plane of light by lens 115 to generate the fan shaped plane of light 36 that exits the laser module housing via aperture 38 such that the plane of light extends perpendicular to axis E-E. The reference tool of the invention allows the plane of light to be adjusted about three orthogonal axes.

Housing 2 consists of an annular wall portion 6 that includes a front wall portion 6a and a back wall portion 6b that can be secured together such as by screws. Back wall portion 6b includes cylindrical receptacles 11 for receiving batteries for powering the laser module. The batteries are connected to the laser module by electrical conductors such as wires or metal strips and an on-off switch 15 is provided for selectively powering the device as will be understood. Caps 13 releasably cover the receptacles 11.

Figure 4:
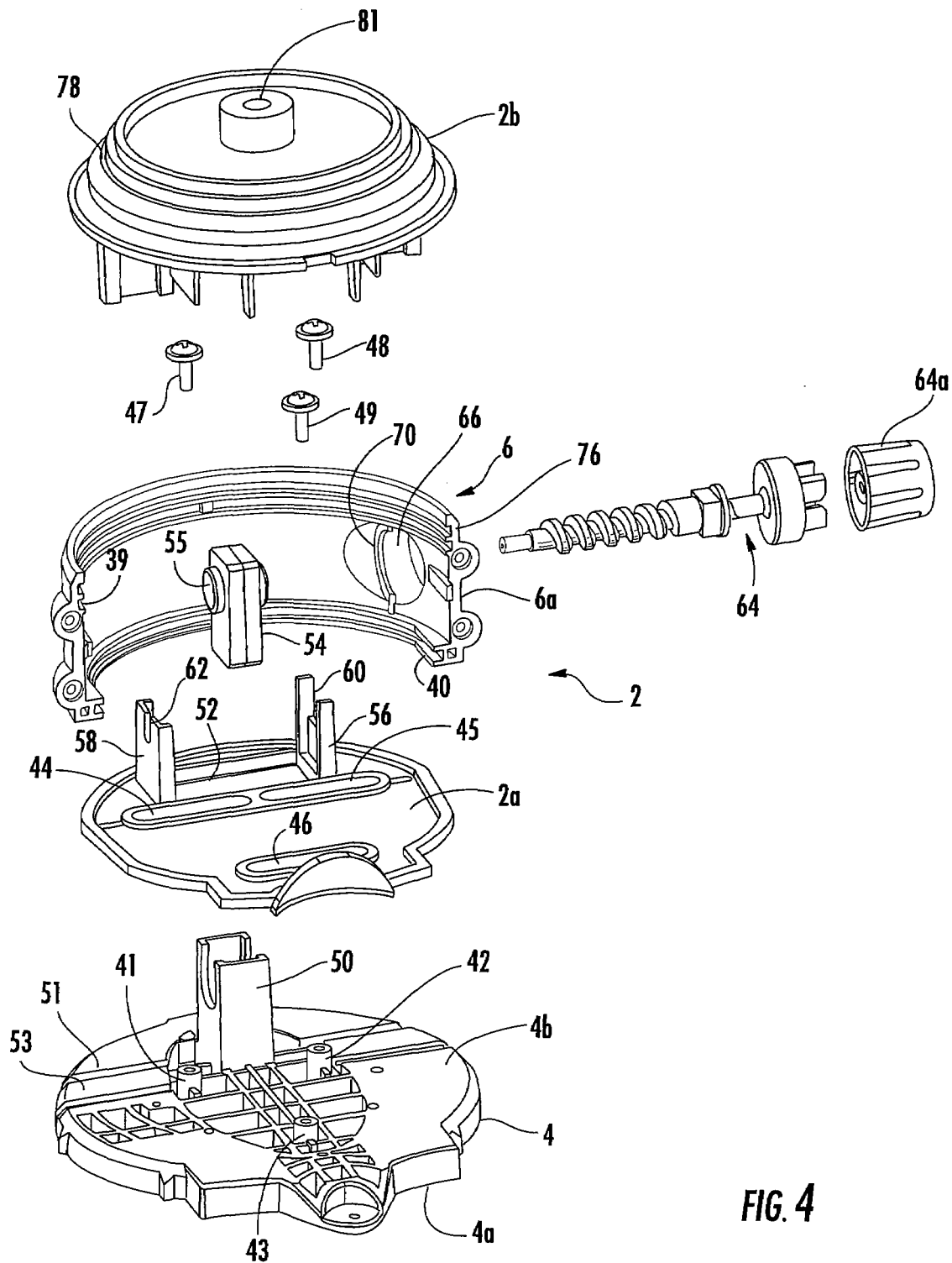
FIG. 4 is a partial exploded view of the laser reference tool of FIG. 1.
Figure 5:
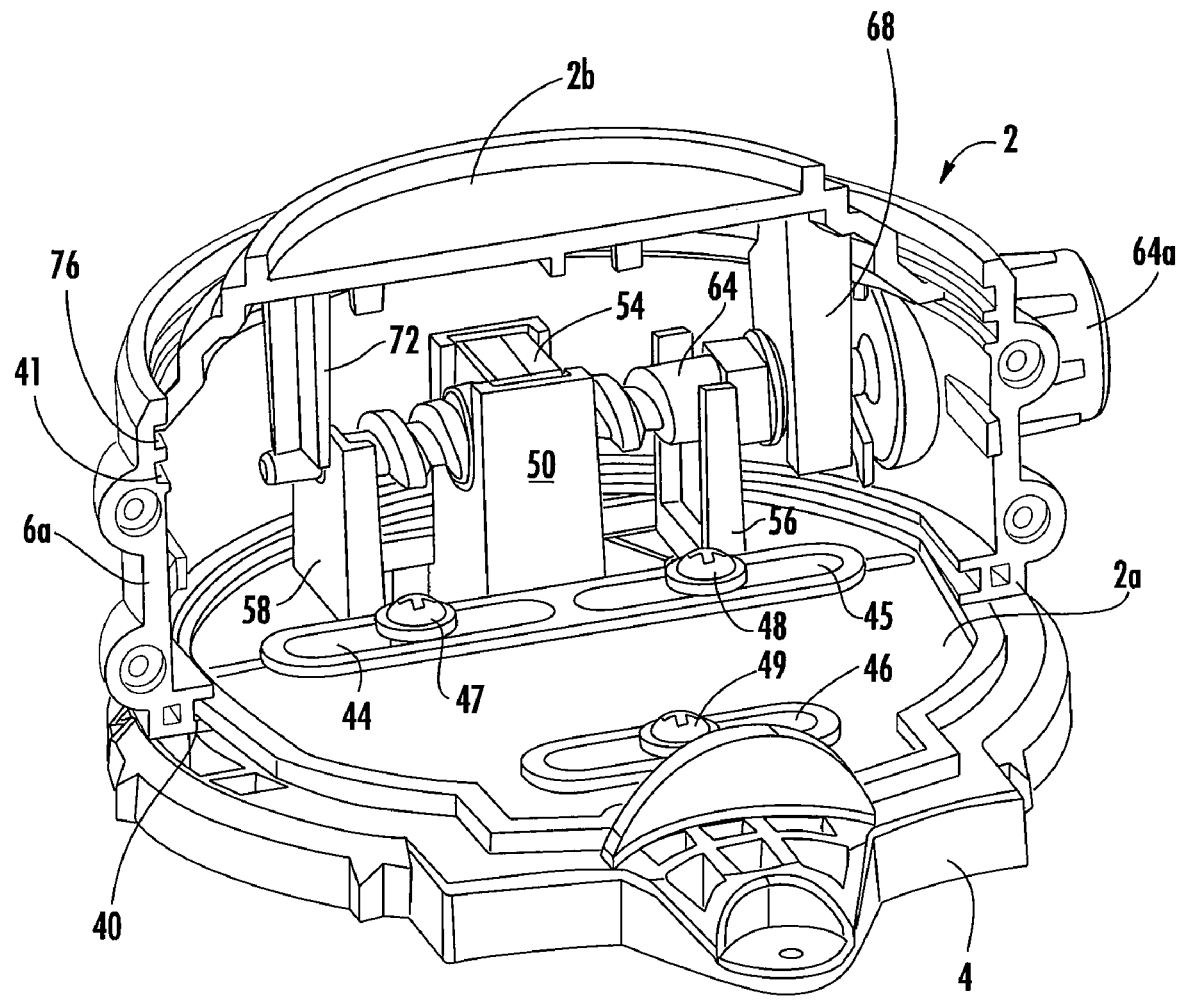
FIG. 5 is a partial assembled view of the laser reference tool of FIG. 1.

Referring more particularly to FIGS. 4 and 5, the arrangement of housing 2 and base 4 is shown in greater detail. A housing bottom portion 2a has its peripheral edge trapped in a slot 40 formed in front wall portion 6a and a similar slot formed in back wall portion 6b (not shown) such that when the front wall portion 6a and back wall portion 6b are secured to one another, housing bottom portion 2a is trapped therebetween in a fixed position. Likewise, a housing top portion 2b has its peripheral edge trapped in a slot 39 formed in front wall portion 6a and a similar slot formed in back wall portion 6b (not shown) such that when the front wall portion 6a and back wall portion 6b are secured to one another, housing top portion 2b is trapped therebetween in a fixed position.

Base 4 comprises a bottom surface 4a that is placed against either a vertical surface or horizontal surface when the device is in use and a top surface 4b. Top surface 4b includes threaded posts 41, 42 and 43 that extend into elongated slotted apertures 44, 45 and 46 formed in housing bottom portion 2a. Slotted apertures 44, 45 and 46 have their long dimension parallel to axis D-D and arrow A. Screws 47, 48 and 49 engage posts 41, 42 and 43, respectively, to secure bottom portion 2a to base 4. The engagement of the posts, slotted apertures and screws allows the housing 2 to slide on base 4 in the direction of arrow A, but prevents the housing 2 from separating from the base 4.

Base 4 further includes a pair of parallel slots 51 and 53 formed in the top surface 4b that are disposed parallel to the longitudinal axis of slotted apertures 44, 45 and 46. The slots 51 and 53 may be slidably engaged by protrusions (not shown) formed on the underside of housing bottom portion 2a to further limit the path of travel of housing 2 relative to base 4 to the direction of arrow A. A column 50 extends from base 4 and is received in rectangular opening 52 formed in bottom portion 2a. The longitudinal axis of rectangular opening 52 is also parallel to the longitudinal axis of slotted apertures 44, 45 and 46 to allow movement of the housing 2 in the direction of arrow A.

Column 50 receives bushing 54 that includes a threaded hole 55. A pair of supports 56 and 58 extend from base 4 and define cradles 60 and 62 that are aligned with threaded hole 55. A screw 64, including cap 64a, threadably engages hole 55 and is supported by cradles 60 and 62. Screw 64 also passes through and is rotatably supported by hole 66 formed in the housing 2. Screw 64 is prevented from moving axially relative to housing 2 in a first direction by support 68 that extends from housing top portion 2b and in a second direction by flange 70. A second support 72 that extends from housing top portion 2b contacts the end of screw 64 to maintain the screw in a position parallel to base 4. When screw 64 is rotated, the engagement of screw 64 with threaded hole 55 provides one mechanism for moving the housing 2 relative to the base 4 in a direction along arrow A. Other mechanisms for moving the housing 2 relative to the base may also be used. The housing can be moved in either direction along arrow A by reversing the rotation of screw 64. In one embodiment screw 64 is manually rotated to allow the user to finely position the device after it is secured to the surface.

Figure 11:
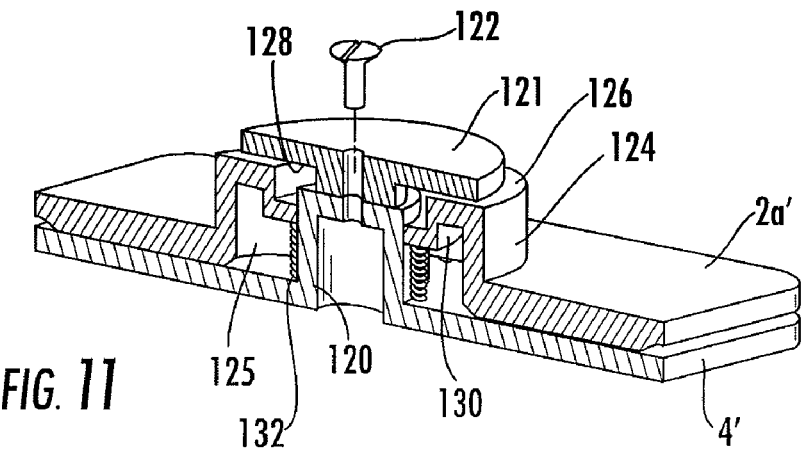
FIG. 11 is a partial perspective section view showing an alternate embodiment of the transverse adjustment mechanism.
Figure 12:
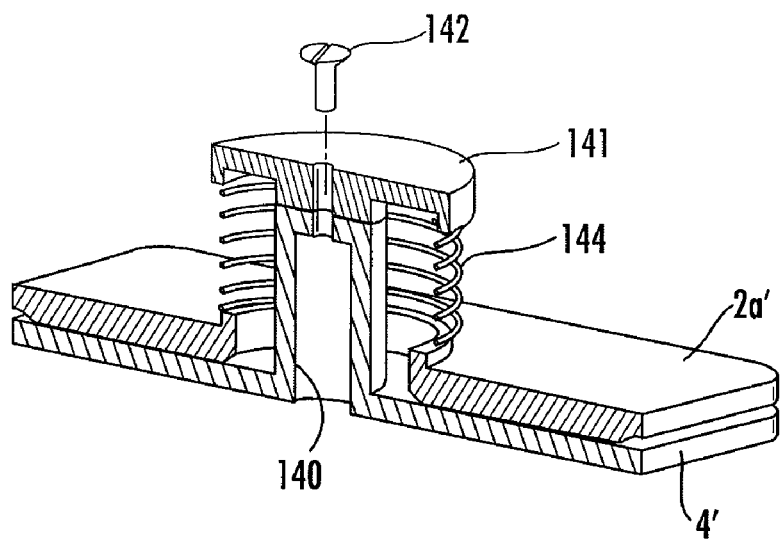
FIG. 12 is another partial perspective section view showing an alternate embodiment of the transverse adjustment mechanism.
Figure 13:
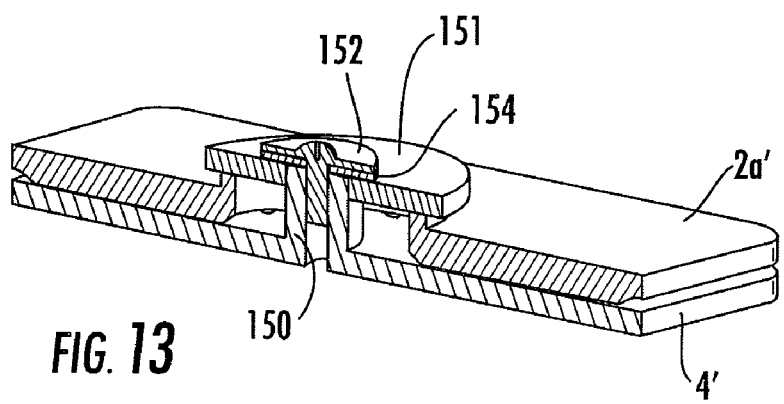
FIG. 13 is yet another partial perspective section view showing an alternate embodiment of the transverse adjustment mechanism.

An alternative mechanism to the screw 64 for allowing fine adjustment of the housing 2 relative to base 4 is shown in FIGS. 11, 12 and 13. In the illustrated embodiments the mechanism allows the housing 2 to move relative to the base 4 in any direction as opposed to the linear reciprocating movement provided by screw 64. Base 4' and housing bottom portion 2a' are shown that correspond to base 4 and housing bottom portion 2a, respectively, of the embodiment shown in FIGS. 4 and 5. It is to be understood that housing bottom portion 2a' supports the housing 2, guide 10, turret 16, and laser module housing 34 and laser assembly as described herein. Moreover, the base 4' may be attached to a surface using the releasable attachment mechanism as previously described.

Referring to FIG. 11, base 4' includes a center post 120 that has a cap 121 secured thereto by a screw or other fastener 122. The housing bottom portion 2a' includes a member 124 that has a cavity 125 for receiving the post 120. Member 124 includes a top 126 and is dimensioned such that the top 126 is opposed to the bottom surface 128 of cap 121. An annular member 130 is also disposed on post 120 such that it is free to move along post 120 toward and away from base 4'. A compression spring 132 urges member 130 toward cap 121 such that the top 126 of member 124 is trapped between member 130 and cap 121. The force applied by the spring 132 determines how tightly or loosely the top 126 of member 124 is held between member 130 and cap 121. The spring force is selected such that housing bottom portion 2a' can be moved relative to base 4' if a force is applied to the housing by a user but the housing bottom portion is held in position relative to the base absent such a force. In this manner the housing can be moved relative to the base in any direction in a plane parallel to base 4' (and parallel to any surface on which base 4' is positioned) such that movement between base 4' and the housing is not limited to a linear motion.

Referring to FIG. 12, base 4' includes a center post 140 that has a cap 141 secured thereto by a screw or other fastener 142. A compression spring 144 is located over post 140 and urges housing bottom portion 2a' toward base 4'. The force applied by the spring 144 determines how tightly or loosely the housing bottom portion 2a' is pressed against base 4'. The spring force is selected such that housing bottom portion 2a' can be moved relative to base 4' if a force is applied to the housing by a user but the housing bottom portion is held in position relative to the base absent such a force. In this manner the housing can be moved relative to the base in any direction in a plane parallel to base 4' (and parallel to any surface on which base 4' is positioned) such that movement between base 4' and the housing is not limited to a linear motion.

Referring to FIG. 13, base 4' includes a center post 150 that has an annular member 151 disposed thereon such that the annular member can move relative to the post toward and away from base 4'. Annular member 151 has a bottom surface that contacts the housing bottom portion 2a'. A screw or other fastener 152 engages post 150. Fastener 152 may be provided with an enlarged head or a separate washer may be used. A round spring 154, such as a flat spring washer, is located between fastener 152 and annular member 151 to urge annular member 151 into engagement with housing bottom portion 2a' such that housing bottom portion 2a' is held between the annular member 151 and base 4'. The force applied by the spring 154 determines how tightly or loosely the housing bottom portion 2a' is held between annular member 151 and base 4'. The force is selected such that housing bottom portion 2a' can be moved relative to base 4' if a force is applied to the housing by a user but the housing bottom portion is held in position relative to the base absent such a force. In this manner the housing can be moved relative to the base in any direction in a plane parallel to base 4' (and parallel to any surface on which base 4' is positioned) such that movement between base 4' and the housing is not limited to a linear motion.

Figure 6:
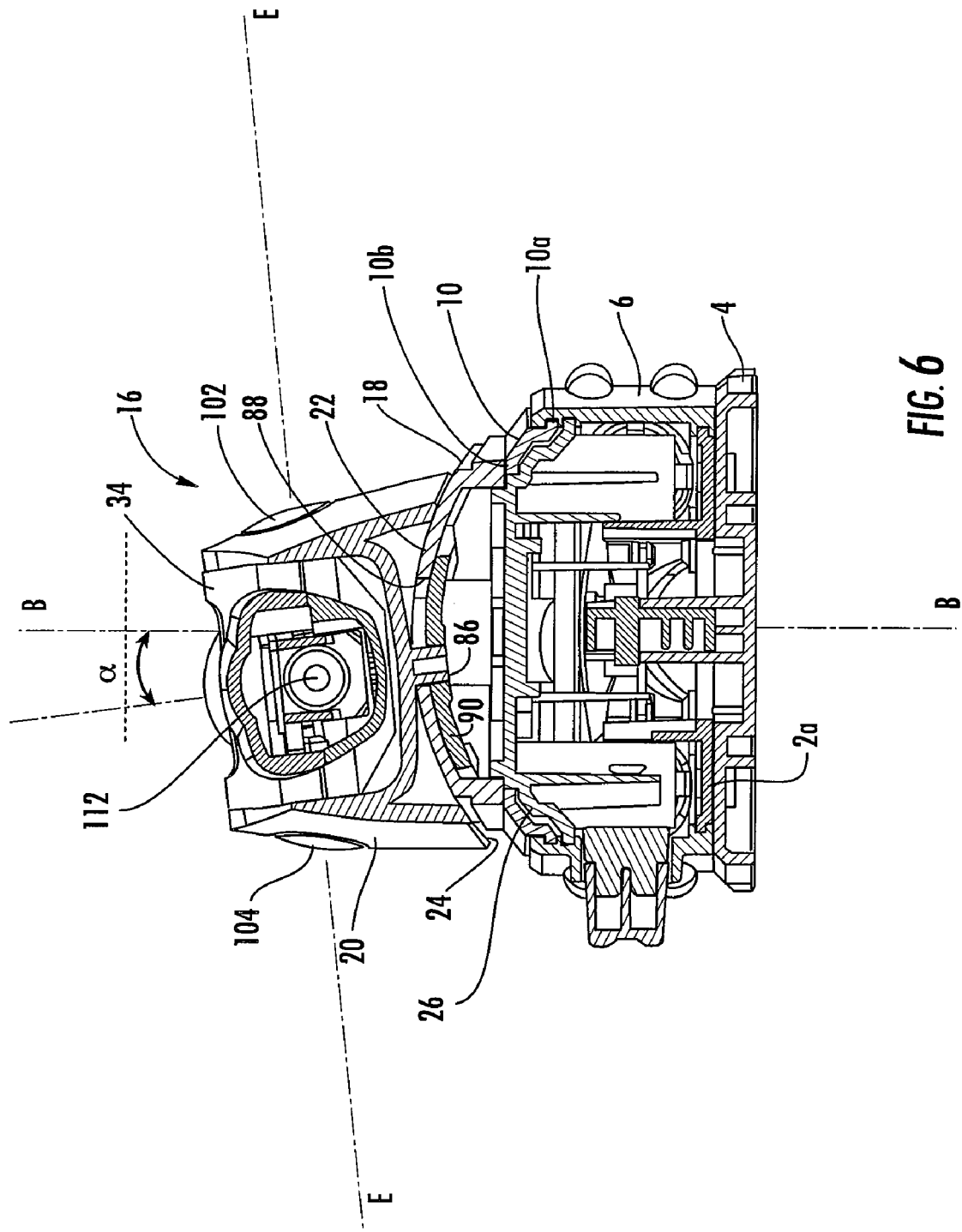
FIG. 6 is a section view taken along line 6-6 of FIG. 2

Housing 2 includes another slot 76 formed about the inside periphery of front wall portion 6a and a similar slot is formed in the back wall portion 6b such that when the front wall portion 6a and back wall portion 6b are secured together, guide 10 is received therein. Referring to FIG. 6, guide 10 has an annular shape where the external edge forms flange 10a that is received in slot 76 such that guide 10 can rotate relative to housing 2 about axis B-B. The internal edge of guide 10 forms a flange 10b that is trapped between the annular ledge 78 formed on housing top portion 2b and base 18 of turret 16. Guide 10 is formed with angular markings 14, as previously described, such that its angular position relative to housing 2 may be determined.

Figure 7:
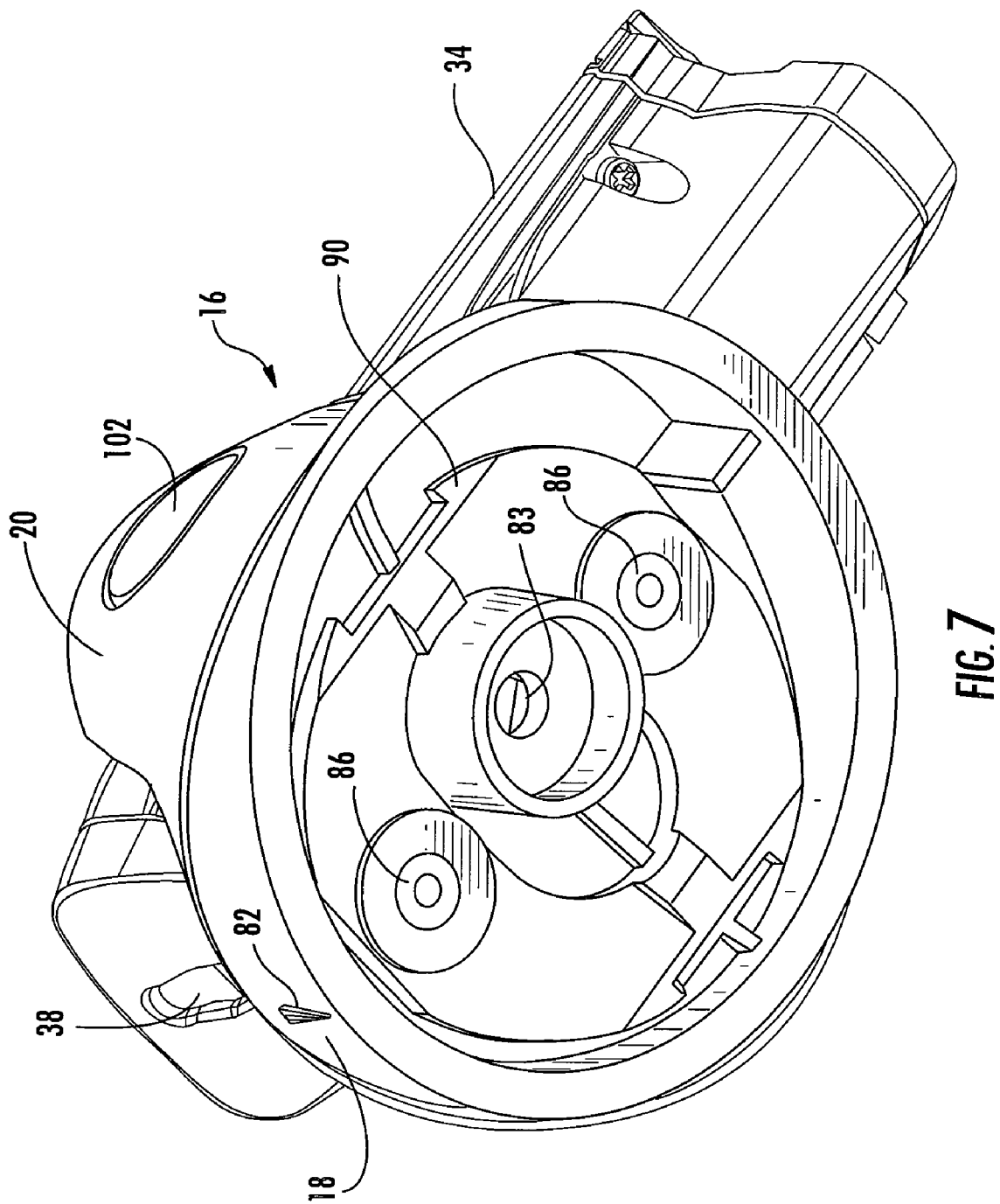
FIG. 7 is a partial assembled view of the laser reference tool of FIG. 1.

Referring to FIGS. 6 and 7, turret 16 includes base 18 that is secured to the top portion 2b of housing 2 such that base 18 can rotate relative to housing 2 and guide 10 about axis B-B. Base 18 may be secured to top portion 2b of housing 2 by a screw (not shown) that passes through hole 81 formed in top portion 2b (best shown in FIG. 4) and is threadably secured in a threaded nut in hole 83 of base 18. Alternatively, hole 83 could be threaded and the screw could threadably engage hole 83 directly. A mark 82 is provided on base 18 that indicates the position of turret 16 relative to guide 10 and housing 2 where mark 82 is aligned with the laser housing aperture 38. Base 18 includes a top surface 22 that has a curved transverse cross section.

Turret 16 also includes a support portion 20. Support portion 20 includes a bottom surface 24 that is complimentary to top surface 22 of base 18. Posts 86 extend from support portion 20 into elongated slots 88 (only one of which is shown in FIG. 6) formed in top surface 22. Posts 86 are connected to a flange 90 that is in sliding engagement with the underside of base 18 opposite to top surface 22. Exerting a force in the direction of arrow A against support portion 20 moves posts 86 within slots 88 such that support portion 20 can pivot relative to the base 18. Because the interfacing surfaces 22 and 24 of the base 18 and support portion 20, respectively, are curved, movement of support portion 20 relative to the base 18 will pivot laser module housing 34 about an axis parallel to axis C-C to vary the angular position a of the laser module housing 34 relative to the base 4. As a result, the angle of the plane of light 36 generated by the laser module can be projected through a range of angles.

Support portion 20 supports laser module housing 34 at pivots 102 and 104 such that the laser module housing 34 can be pivoted relative to the base 4 about axis E-E. Pivots 102 and 104 tightly engage laser module housing 34 such that while the laser module housing 34 can be manually pivoted, the laser module housing will be held in position by frictional engagement between it and the supports 30 and 32. Laser module housing 34 further includes three orthogonally arranged level vials 106, 108 and 110. When mounted on a vertical surface level vials 106 and 108 indicate the angle of the laser module housing relative to horizontal.

Figure 8:
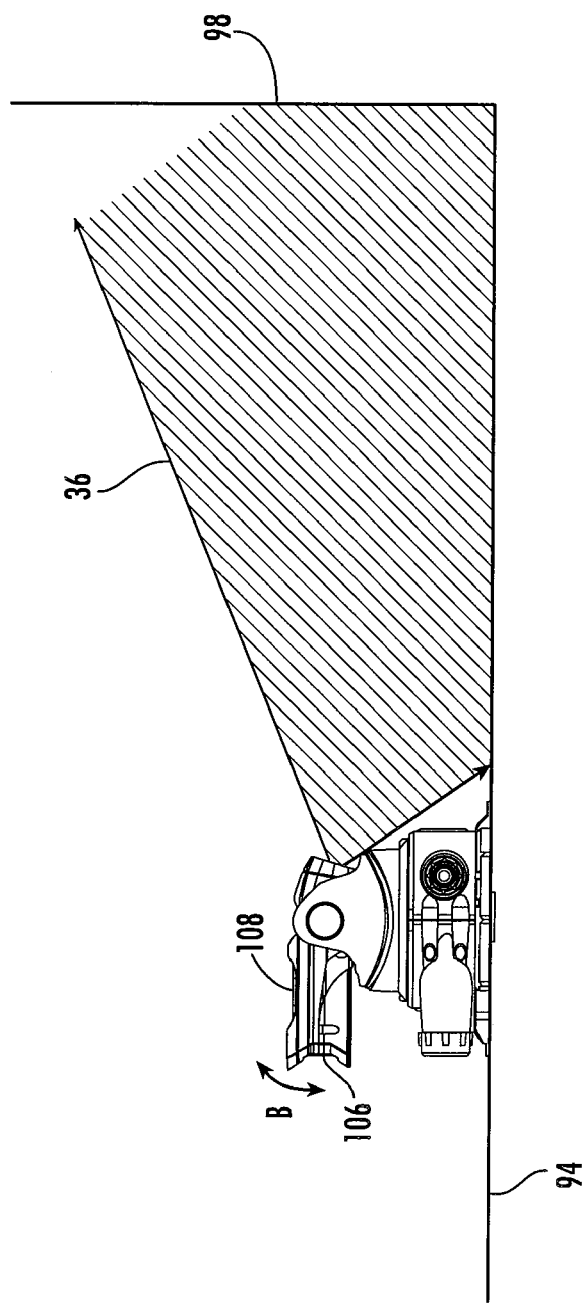
FIG. 8 is a side view of the laser reference tool of FIG. 1 showing the laser light pattern.
Figure 10:
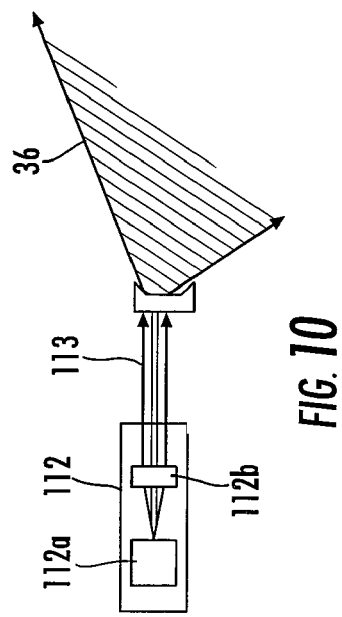
FIG. 10 is a schematic view showing the laser module and lens used in the invention.
Figure 9:
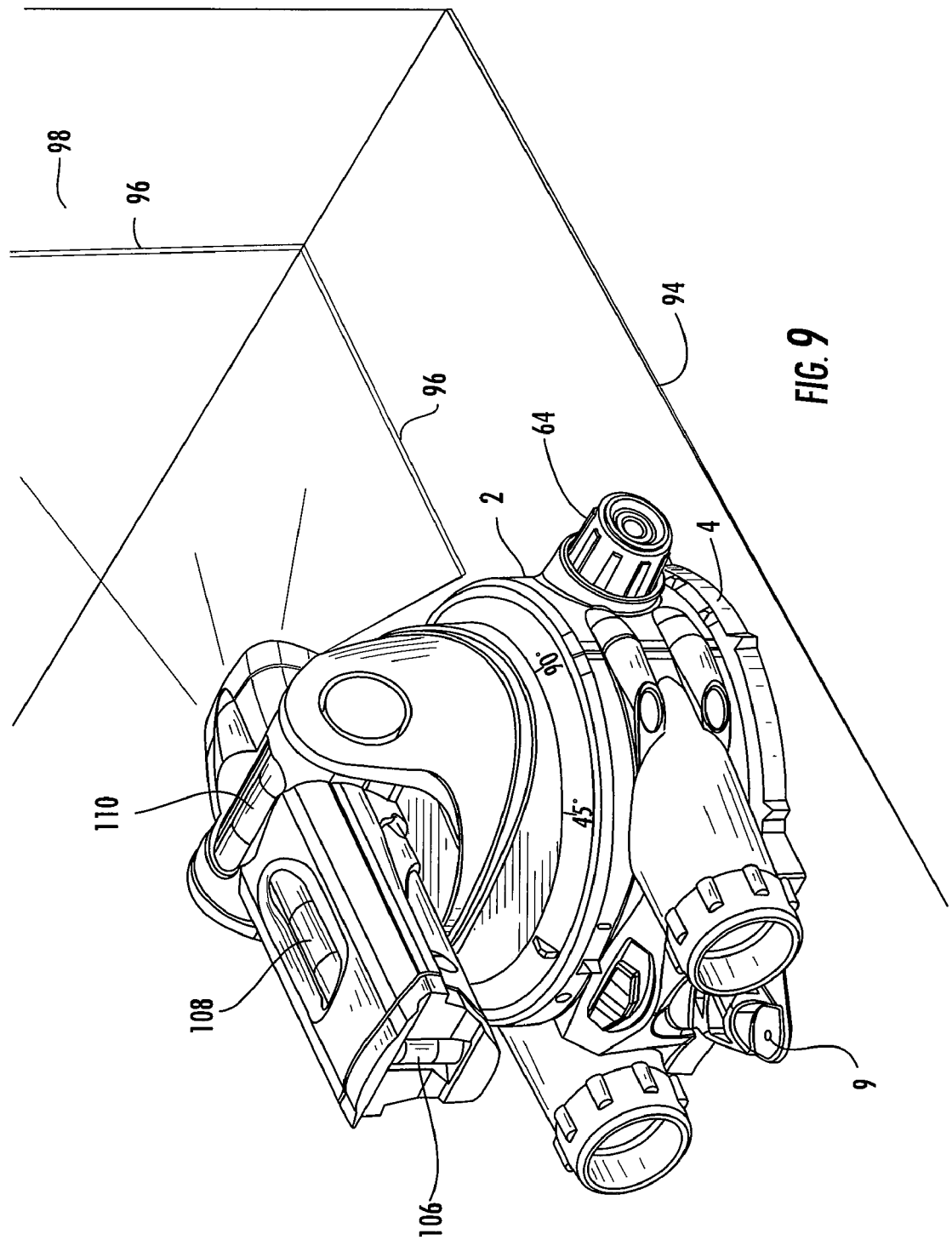
FIG. 9 is a perspective view of the laser reference tool of FIG. 1 showing the laser light pattern on intersecting surfaces.

Referring to FIGS. 8 and 9 the plane of light 36 will create a visible line of light 96 on any surface 94 and 98 that the light intersects. The fan is oriented such that the plane of light will intersect the surface 94 on which the base 4 is supported and a surface 98 that intersects that surface. For example, if the device is supported on a wall, the plane of light will create a reference line of light on the wall on which it is supported and on the adjacent wall.

In one embodiment the laser module uses a lens that generates the line of light such that an area of relatively higher intensity light is generated in the central portion of fan 36 such that the area of higher intensity light is projected a predetermined distance from the laser level device. In one embodiment the area of higher intensity light is created approximately 20 feet from the device. By centering the area of higher intensity light on the corner where the two surfaces 94 and 98 intersect, the reference line displayed on the surfaces will appear to be uniform to the eye along the entire length of the line. In operation the device is mounted to the surface and the laser module is energized to create the plane of light. The laser module housing 34 is pivoted as shown by arrow B to locate the area of highest light intensity on the corner where the two surfaces intersect. The lens is selected such that the length of light projected along surface 94 on which the device is mounted will be approximately twice the length of the light projected on surface 98. Thus, if the device is positioned on surface 94 approximately 20 feet from surface 98, the length of the light projected on surface 98 will be approximately 10 feet.

The method of using the laser reference tool 1 of the invention will be described with respect to FIG. 9 to project a horizontal plane of light on a vertical surface. The tool 1 is mounted to vertical surface 94 in the approximate position where line 96 is to be projected on surface 94. The device can be mounted to the surface using the releasable adhesive tape 8 to mount base 4 to the surface. Once the device is mounted to surface 94, the exact position of line 96 on surface 94 can be adjusted by the user by rotating screw 64 to move the housing 2 relative to base 4. For example, if it is desired to project the line on a wall four feet above the floor, the device is located and mounted to the wall such that the laser line is at approximately four feet. Screw 64 is then rotated to adjust the housing either up or down to precisely locate the laser line at exactly the four foot mark. This fine adjustment allows the user to precisely position the tool on the surface after it is attached thereto to simplify the mounting process and make the positioning of the laser module more accurate.

The laser line 96 can then be oriented relative to horizontal. Specifically, turret 16 is rotated until level vial 108 indicates that laser level housing 34 is horizontal. At this point the tool will project a line parallel to horizontal. If a line projected at a different angle is desired, guide 10 is rotated until the zero degree marking is aligned with mark 82 on the turret 16. Because turret 16 is horizontal, as shown by level vial 108, the zero degree marking on guide 10 will also be at horizontal. The turret 18 can then be rotated relative to housing 2 and guide 10 to be positioned at any angular orientation as indicated by guide 10. By using the markings 14 on guide 10 the laser module housing 34 can be accurately positioned at any angle relative to horizontal.

To align the plane of light on a secondary surface such as surface 98, support portion 20 can be pivoted relative to base 18 until level vial 106 indicates that laser module housing is horizontal and the plane of light is oriented parallel to horizontal ensuring that the visible line of light projected on the surface 98 is horizontal.

To mount the tool on a vertical surface to project a vertical plane of light the same process is followed except that level vial 110 is used to align the device to vertical rather than using level vial 108 to align the device relative to horizontal.

Once the device is mounted on the surface, the location of the area of higher intensity light relative to the device is adjusted by pivoting laser module housing about axis E-E as represented by arrow B in FIG. 8. In one embodiment the area of higher intensity light can be located in a corner to project orthogonal lines of light on two perpendicular surfaces where the lines of light appear to the user to have equal intensities over their entire lengths.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

What is claimed is:

1. A reference tool comprising:
   a light source; and
   a base for supporting the light source on a surface, wherein said light source is rotatable relative to said base about three fixed orthogonal axes,
   wherein the light source is movable relative to the base in a direction parallel to the surface.

2. The reference tool of claim 1, wherein the light source is simultaneously rotatable relative to said base about said three fixed orthogonal axes.

3. The reference tool of claim 1, further comprising an attachment mechanism for attaching said base to said surface.

4. The reference tool of claim 3, wherein the base is adapted to support the light source on a vertical surface.

5. The reference tool of claim 4, wherein the light source is movable relative to the base in a direction parallel to the surface and that is a fixed linear direction.

6. The reference tool of claim 1 wherein the light source is a laser.

7. The reference tool of claim 1 wherein the light source projects a plane of light.

8. A reference tool comprising:
   a light source;
   a base for supporting the light source, said light source being simultaneously rotatable relative to said base about first, second, and third orthogonal axes, wherein the first axis is perpendicular to the base and wherein the second and third axes are in different planes from each other;
   an attachment mechanism for attaching the base to a vertical surface; and
   means for orienting the light source.

9. The reference tool of claim 8 further including a guide for indicating the position of the light source about said first axis.

10. The reference tool of claim 8 wherein the light source is rotatable about an axis parallel to the vertical surface.

11. The reference tool of claim 8 wherein the means for orienting the light source includes at least one level vial.

12. A reference tool comprising:
    a light source;
    a base for supporting the light source, said light source being rotatable relative to said base about three fixed orthogonal axes;
    an attachment mechanism for attaching the base to a vertical surface; and means for orienting the light source, and
    a mechanism for moving the light source relative to the base in a linear direction.

13. The reference tool of claim 12 wherein the mechanism for moving the light source includes a screw mounted such that rotation of the screw moves the light source in the linear direction.

14. The reference tool of claim 13 wherein said mechanism for moving the light source is in a housing, said housing supporting a turret, said turret being pivotably mounted to said housing.

15. The reference tool of claim 14 wherein said turret includes a first portion pivotably mounted on a second portion, said second portion supporting said light source.

16. The reference tool of claim 15 wherein said light source is pivotably mounted relative to said second portion.

17. The reference tool of claim 13 wherein the screw is manually operated.

18. A reference tool comprising:
    a light source; and
    a base for supporting the light source on a surface, wherein said light source is rotatable relative to said base about a first fixed axis, a second fixed axis, and a third fixed axis, wherein the first fixed axis and second fixed axis are orthogonal and intersect, the first fixed axis and third fixed axis are orthogonal and intersect, and the second fixed axis and third fixed axis are orthogonal and do not intersect,
    wherein the light source is movable relative to the base in a direction parallel to the surface.

19. The reference tool of claim 18, wherein the light source is simultaneously rotatable relative to said base about said three fixed orthogonal axes.

20. The reference tool of claim 18, wherein the light source is movable relative to the base in a direction that is parallel to the surface and that is a fixed linear direction.

21. A reference tool comprising:
    a light source; and
    a base for supporting the light source, said light source being simultaneously rotatable relative to said base about first, second, and third orthogonal axes, wherein the first axis is perpendicular to the base and wherein the second and third axes are in different planes from each other.

* * * * *